United States Patent Office 3,320,216
Patented May 16, 1967

3,320,216
SATURATED LINEAR COPOLYMERS
George B. Butler, Gainesville, Fla., assignor to Peninsular Chem Research, Inc., Gainesville, Fla., a corporation of Florida
No Drawing. Filed Mar. 2, 1965, Ser. No. 436,677
12 Claims. (Cl. 260—78.5)

This application is a continuation-in-part of my copending application Serial No. 59,816, filed October 3, 1960, which is in turn a continuation-in-part of my application Serial No. 803,838, filed April 3, 1959 both prior applications now abandoned.

This invention is directed to novel saturated linear copolymeric high molecular weight materials, and to processes for making the same. More particularly, this invention is directed to saturated linear copolymers having repeating units in the polymeric chain exemplified by the following structure:

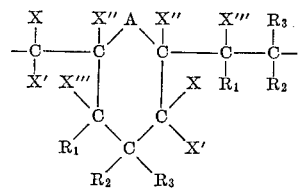

Wherein A, X, X', X'', X''', $R_1$, $R_2$, $R_3$ and $n$ have the meaning, stated hereinafter.

The art of polymerization, copolymerization, and of polymeric and copolymeric resins is highly developed in the use of both mono-olefinic and diolefinic monomeric reactants. Generally speaking, it is known that an ethylenically unsaturated organic compound can be polymerized to form long-chain linear molecules, respective monomeric reactants adding to each other across the respective carbon-carbon double bonds. It is also generally known that diethylenically unsaturated organic compounds having two olefinic double bonds may be polymerized to form large molecules having a cross-linked structure. It is also known that the mono-olefinic and di-olefinic compounds may be copolymerized to form cross-linked large molecules, as a general matter. Cross-linked structures typically are formed because of the di-functionality of the monomer. In some cases this copolymerization reaction may be conducted so as to avoid cross-linking, but with the retention of one unreacted double bond in the diolefinic comonomer so that the resulting copolymer is vulcanizable.

In my copending application, Serial No. 720,040, filed March 10, 1958, I have further described certain novel linear homopolymers formed by the free radical polymerization of 1,6-di-unsaturated monomers. The linear homopolymers to which that invention is directed generally having repeating units in the homopolymer molecule corresponding to the structural formula,

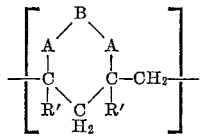

wherein A represents a methlyene or carbonyl radical; B represents a

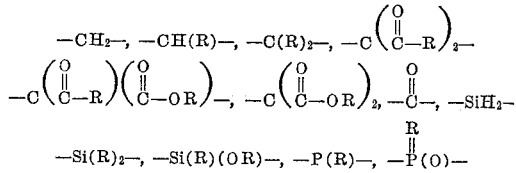

etc., radical; R represents an alkyl radical; R' represents an alkyl, aryl halogen, or cyano radical.

Still other novel linear homopolymers are described in copending application, Serial No. 720,092, filed March 10, 1958, wherein the homopolymers are composed of repeating units having the structural formula,

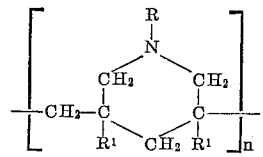

wherein R, $R^1$ and $n$ have similar significance.

It will be observed that the homopolymers in each of those copending applications have generally linear structures, but that the chain is composed of a series of heterocyclic rings linked to each other through a methylene group, meta to the hetero-atom in the ring.

It is an object of the present invention to provide certain novel saturated linear copolymers and a process for making the same.

More specifically, it is an object of this invention to provide novel saturated linear copolymers wherein the repeating unit in the polymeric chain has the structure,

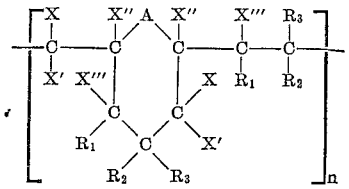

wherein A, X, X', X'', X''', $R_1$, $R_2$, $R_3$ and $n$ have the meaning discussed hereinafter.

It is a further object of this invention to provide novel saturated linear copolymers wherein the repeating unit in the polymeric chain having the above structure is further substituted by groups which may be converted by hydrolysis or other means to carboxylic acid groups.

Still another object of this invention is to provide a process for making the aforesaid copolymers.

Other objects of this invention will become apparent to those skilled in the art from the following description thereof.

The novel saturated linear copolymers provided by the present invention are formed by the copolymerization of 1,4-di-olefinically unsaturated monomers with mono-olefinically unsaturated monomers. The polymerization reaction is believed to involve two separate propagation steps, the first is believed to involve a 2,5-free radical addition of a mono-olefinic material across the di-olefinic reactant, and the second step a free radical reaction of the first product with a second mono-olefinic molecule. It is observed that the instant copolymers generally contained approximately two moles of the mono-olefinic reactant for every mole of the di-olefinic reactant. The mechanism for the polymerization is believed to take place in the following manner (using divinyl ether and ethylene as examples):

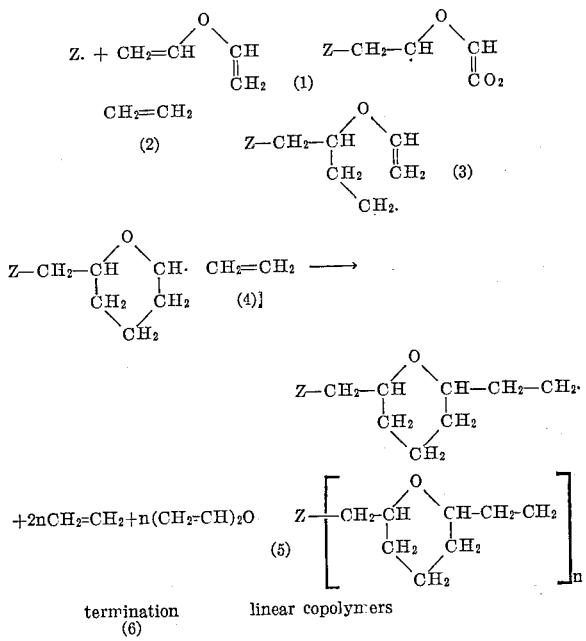

In this mechanism Z. stands for a free radical initiator. Step (1) may be called the initiation step, step (2) is a first intermolecular propagation step, step (3) is an *intramolecular* propagation step, and step (4) is a second *intermolecular* propagation step. Step (5) is the repeated combination of steps (1), (2), (3) and (4), leading to the linear copolymer molecule, having $n$ repeating units, before termination of the chain reaction is reached. Termination occurs in the usual fashion for free radical chain polymerization reactions, i.e. when the growing polymer chain reacts with a protonic free radical or other stopping radical.

This copolymerization reaction may be carried out under a wide variety of conditions. The temperature used may vary from 0° to about 100° C., but is preferably elevated above room temperature and at a temperature of from about 40° to about 75° C. is best. The reaction may also be conducted at either atmospheric pressure or under elevated pressures equivalent to those autogenously developed under sealed bomb conditions. When the reaction is conducted at atmospheric pressure, it is convenient to proceed under reflux conditions, the boiling point of the reaction medium providing the appropriate reaction temperature. On the other hand, when conducting the reaction under autogenous pressure conditions, the temperature may be independently controlled as desired. Generally speaking, however, there is no critical limitation to the temperature or pressure for the reaction other than the decomposition temperature for the monomer, and, as indicated for atmospheric pressure conditions, the boiling point of the reaction medium. Depending primarily on the temperature, the reaction will generally be completed within a necessary period of time of from about 1 to 24 hours, typically within about 2 to 7 hours. Longer times may, of course, be used as for instance up to several days.

The polymerization reaction of this invention is carried out with the monomers in solution in a solvent, or in an aqueous emulsion. In this procedure it has also been found that the concentration of the monomers in solution must generally be at least about 15% by weight of the total ingredients in order for the reaction to proceed according to this invention. At lower concentrations, other interfering reactions occur, or the reaction fails to go to completion.

An example of such a case may be seen in Example 8–V of U.S. Patent 2,798,053 wherein maleic anhydride and divinyl ether were copolymerized at a total monomer concentration of about 10%. The product from that reaction does not show the characteristics of the compounds of the present invention, nor their structure. The product of that patent dissolved in water overnight with hydrolysis and infra-red studies demonstrate the presence of alcoholic hydroxyl groups after hydrolysis. The additional evidence of unsaturation *before* but no unsaturation *after* hydrolysis, and the known ease of hydrolysis of vinyl ether linkages indicates clearly that the product of the patent example had pendant vinyl ether linkages, substantially unreacted, so that the peculiar intra-molecular cyclization reaction of this invention did not occur.

These same components will, however, form the product of the present invention when reacted according to Example VIII herein.

The process of this invention may accordingly be conducted generally in a solvent or in an emulsion at total monomer concentration of from about 15% to about 90%, preferably from about 20% to about 80%, depending on the tendency of the monomer to homopolymerize. The most practical concentration range is from about 25% to about 50% taking into account the fact that the copolymer product frequently precipitates to form a slurry, and stirring can become difficult in later stages of the reaction.

Generally any solvent, which is a solvent for the monomers, may be used in the polymerization reaction. Examples of such solvents include aromatic hydrocarbons such as benzene, toluene, ethylbenzene, xylene, etc. Other solvents which may be used include dioxane, ethers of ethylene glycols such as dimethyl ethylene glycol, diethyl ethylene glycol, and alcohols such as methanol, ethanol, propanol, etc., and ketones such as acetone, methylethylketone, diethylketone, and esters such as methylacetate, ethylacetate, ethylpropionate, etc. It will, of course, be understood that the solvent used is aliphatically saturated and substantially inert so far as participating in the polymerization reaction is concerned. In addition, as will be brought out more fully hereinafter, certain monomers which may be used in the instant copolymerization processes contain reactive groups other than the carbon-carbon double bonds. In such cases, it is important that the solvent also be inert to such reactive groups on the monomeric reactants. Generally speaking, the preferred solvents are the aromatic hydrocarbons since they satisfy all the criteria.

The processes for producing the present copolymers will generally employ catalysts previously used in free radical olefinic polymerizations. It is particularly advantageous to use peroxygen catalysts such as di-tertiary butyl peroxide. Other peroxide catalysts include inorganic peroxides such as hydrogen peroxide and barium peroxide, etc.; and organic peroxides such as various dialkyl peroxides, alkyl hydrogen peroxides and diacyl peroxides such as acetyl peroxide and benzoyl peroxide as well as peracids, such as peracetic acid and perbenzoic acid and salts of inorganic peracids such as ammonium and potassium persulfate. Cyclic peroxides can also be used such as tetralin hydroperoxide and cumene hydroperoxide. Other "free radical" catalysts such as azo compounds, e.g. azoisobutyronitrile, and oxygen may be employed as a polymerization catalyst.

In addition to using the peroxide catalysts mentioned above, a further embodiment of this invention involves the use of a Ziegler-type catalyst. The general technique of carrying out the reaction will be the same as where a peroxygen catalyst was used, but the Ziegler-type catalyst will be most advantageous for the polymerization of those monomers which do not contain oxygen or similar electron donors. Generally, any Ziegler-type catalyst may be used. These are enumerated in Belgian Patent 713,081, to Ziegler, and include a mixture of a metal compound, where the metal is a Group IVb, Vb, or VIb metal with a beryllium or aluminum alkyl or aryl compound, or a beryllium or aluminum alkyl hydride or aryl hydride. Of the metal compounds forming the first component of the mixture titanium tetrachloride is preferred and the preferred beryllium compound is dibutyl beryllium. Various alkyls, aluminums, and berylliums may be, of course, used with satisfactory results. In addition, magnesium and zinc alkyls may be used in place of the beryllium or alkyls. Among the Group IVb, Vb and VIb metals which can be used, there may be mentioned zirconium, thorium, vanadium, chromium, molybdenum, tantalum, niobium, etc., in the form of their chlorides, alkyls, hydrated oxides, bromides, acetates, acetylacetonates, oxalates, phosphates, oxybromides, etc.

When either a Ziegler-type catalyst or a peroxygen catalyst is employed, the catalyst will be used in a conventional catalytic amount. Conveniently, the amount of catalyst used may be within the range from about 0.5 to about 20%, but generally for purposes of effectiveness of the reaction and economy, no more than about 8% by weight of the monomer may be used.

As hereinbefore stated, my invention utilizes as one of the monomeric reactants a 1:4-diene. Such 1:4-dienes are particularly well exemplified by compounds such as divinyl ether, divinyl dimethyl silane, divinyl cyclopentamethylene silane, divinyl sulfone, and 1:4-pentadiene. These are, however, only typical examples and a wide variety of 1:4-dienes may be employed in equivalent manner. The only structural requirement is that the atom or atomic grouping intermediate the two carbon-carbon double bonds be such that the angles will permit formation of the six-membered ring formed in the polymer. Thus, additional 1:4-dienes which may be used include Divinyldiphenylsilane,
Divinyldi-(cyanoethyl)-silane,
Divinylcyclotetramethylenesilane,
3,3-dimethyl-1,4-pentadiene,
2,4-dimethyl-1,4-pentadiene,
Divinylsulfide,
Divinylsulfoxide,
Diisopropenyl ether,
Di-n-propenyl ether,
Vinyl isopropenyl ether,
Vinyl propenyl ether,
Divinyl ketone,
Diisopropenyl ketone,
Di-n-propenyl ketone,
Vinyl isopropenyl ketone,
Vinyl n-propenyl ketone,
3-carbomethoxy-1,4-pentadiene,
3,3-dicarbomethoxy-1,4-pentadiene,
2,4-dichloro-1,4-pentadiene,
2,4-dicyano-1,4-pentadiene,
2,4-diphenyl-1,4-pentadiene,
2,4-dicarbomethoxy-1,4-pentadiene,
1,1-divinylcyclopentane,
1,1-divinylcyclohexane,
2,4-difluoro-1,4-pentadiene,
1,4-perfluoropentadiene,
Divinylmethylamine,
Divinylphenylamine,
Divinylmethylamine oxide,
Divinylphenylamine oxide,
Divinyldimethylammonium chloride,
Divinylmethylphenylammonium chloride,
Divinylmethylphosphine,
Divinylmethylphosphine oxide,
Divinyldimethylphosphonium chloride,
Divinylphenylphosphine,
Divinylphenylphosphine oxide,
Divinylmethylphenylphosphonium chloride,
Divinylmethylarsine,
Divinylphenylarsine,
Divinylmethylarsine oxide,
Divinylphenylarsine oxide,
Divinyldimethylarsonium chloride,
Divinylmethylphenylarsonium chloride,
Divinylmethylstibine,
Divinylphenylstibine,
Divinylmethylstibine oxide,
Divinylphenylstibine oxide,
Divinyldimethylstibonium chloride,
Divinylmethylphenylstibonium chloride,
Divinylsilane,
Divinyldiethoxysilane,
Divinyldichlorosilane,
Divinylgermane,
Divinyldiethoxygermane,
Divinyldichlorogermane,
Divinyldimethylgermane,
Divinyldiphenylgermane,
Divinyldimethyl tin,
Divinyldiphenyl tin,
Divinyldiethoxy tin,
Divinyl tin dichloride, and
Divinyldimethyl lead.

Similarly, a wide variety of mono-olefinically unsaturated monomers may be used in the practice of this invention. Typical examples of these monolefines include vinyl acetate, acrylonitrile, maleic anhydride, fumaronitrile, fumaryl chloride, dimethyl fumarate, diethyl maleate, dimethyl fumarate, as well as the simplest mono-olefines such as ethylene, propylene, butene-1, butene-2, etc. The only structural requirement for the mono-olefin is that it be capable of participation in catalyzed polymerization reactions. Accordingly, any mono-olefin which will polymerize under a free radical initiation, may be used in the practice of this invention. As further illustrative of such mono-olefins, there may be mentioned styrene, methyl methacrylate, methyl acrylate, ethyl acrylate, ethyl ethacrylate, vinyl chloride, vinylidene chloride, vinyl trimethyl silane, vinyl naphthalene, and vinyl methyl ether. Actually, and in general, suitable mono-olefins which may be employed include those formed by replacing one of the vinyl (or substituted vinyl) groups in the above-described 1:4-dienes by the lower alkyl or aryl group.

Thus, the linear copolymers provided by this invention are those having a repeating unit of the structure:

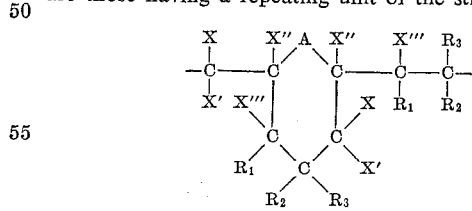

wherein A stands for an element of Groups IVa, Va and VIa of the Periodic Table, the free valences (as in the case of S, C, Si, N, Sb, Sn, Ge, etc.) are attached to a radical which may be oxygen, hydrogen, lower alkyl, lower alkylene, alkoxy, cyano-lower alkyl, monocyclic aryl, carboxy-lower alkyl and halogen; wherein $R_1$ and $R_2$ may be any of hydrogen, lower alkyloxy, carboxy lower alkyl, nitrile, or carboxy-halide, or together $R_1$ and $R_2$ may represent the anhydride radical

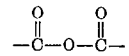

wherein $R_3$ stands for hydrogen or lower alkyl; and wherein X, X', X'', and X''' may be any of hydrogen, lower alkyl, monocyclic aryl, nitrile, halogen, and carboxy-lower alkyl.

The corresponding monomer materials may be copolymerized to form the polymers of this invention by conducting the reaction in an aromatic hydrocarbon solvent or a non-functional group containing solvents such as dioxane or the diethyl ether or ethylene glycol, etc. When the 1:4-diene and the mono-olefin being polymerized do not contain a condensation-reactive group, then the other solvents such as glycols, alcohols, ketones and esters mentioned hereinbefore, may also be used. However, when either the 1:4-diene or the mono-olefin contains such a condensation-reactive group, then it is preferred to only use the aromatic hydrocarbon solvents. Otherwise, there is a possibility of reaction between the growing polymer or the monomeric units thereof, with the solvent itself, leading to undesired materials and complex difficultly separated products. By "condensation-reactive group" is meant a group which will participate in a condensation reaction in the broad sense of the word, i.e. an ionic reaction between 2 molecules to form a new molecule, usually with the loss of a by-product. Such reactions include esterification (loss of water), transesterification (loss of alcohol), alcohol acid chloride esterification (loss of HCl), alcohol plus acid anhydride esterification (here, formation of an adjacent carboxyl group rather than actual loss of atomic components), nitrile alcoholysis, ketone alcoholysis, etc., as well as the aldol type of condensation. The proper selection of the solvent will be apparent to one skilled in the art from the foregoing description.

Preferably, the 1:4-diene used in the practice of my invention are those with a straight unsaturated chain of at most 6 atoms, and wherein this chain carries as substituent groups such as hydrogen, halogen, cyano lower alkyl, monocyclic aryl, carboxy, carboxy lower alkyl, carboxyhalide, and carbon-lower alkyl. The mono-olefin is preferably a relatively simple lower olefin, which may be regarded as ethylene substituted by groups such as hydrogen, lower alkyl, carboxyanhydride, carboxy lower alkyl, carbon-lower alkoxy, nitrile, halogen, lower alkoxy, and mono- and di-cyclic aryl.

While the above description relates to the preferred embodiment of this invention, in some instances it may be desirable to form copolymers wherein the cyclic units are linked together through several of the mono-olefinic units, by using a mono-olefin:di-olefinic reactant ratio of more than 2:1. Thus, the individual repeating units defined above may be separated by units of the average formula.

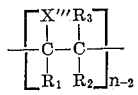

X''', $R_1$, $R_2$, $R_3$, and $n$ having the meanings stated above.

A further feature of my invention is that the copolymerization reaction is stereo specific, and consequently isotactic polymers are obtained when unsymmetrical mono-olefins are employed. For instance, two distinct isotactic linear acidic copolymers are obtained by copolymerization of divinyl ether with maleic anhydride, followed by hydrolysis of the acid anhydride group, and from copolymerization of divinyl ether with fumaryl chloride, followed by hydrolysis of the acid chloride group, forming in each case a carboxylic group-substituted linear copolymers.

Generally speaking, the polymers provided by my invention have a molecular weight above 5,000 and generally in the range of about 10,000 to about 20,000 molecular weight units. The copolymers formed from divinyl silane and divinyl sulfone with maleic anhydride and analogous mono-olefins, usually have a molecular weight in the range of from about 7,000 to about 10,000 molecular weight units. However, the above-mentioned upper limits for the molecular weight are not absolute but may be exceeded in a given set of polymerization conditions where the growing polymer chain remains in the solvent instead of precipitating therefrom. Generally, the polymers are fiber- and film-forming materials, and the molecular weight is, accordingly, such as to confer that functional property.

The linear copolymers provided by this invention are thus useful as fiber- and film-forming materials, providing fibers which may be knitted or woven and used for the manufacture of cloth, and film which may be used as protective coatings or package wrappings, and not unlike the properties of polypyrollidine (except of course for the absence of an amino group basic reactivity). In addition, those polymers provided by my invention which have a side chain structure on the basic carbon skeleton of the repeating unit a radical which is, or can be, readily converted to a carboxylic acid group, or useful as soil conditioning agents. These latter polymers can be used to facilitate soil husbandry. The various copolymers are also useful as lubricants and lubricant additives, pour point depressants, elastomers, molding resins, foam resins, adhesives, and as cross-linking agents (in themselves) for epoxy resins.

While the above discussion will make it clear that my invention is not limited thereto, the following examples will illustrate preferred embodiments thereof and indicate the manner in which the linear copolymers are formed according to my invention, it being understood that generally the conditions used for any given pair of a 1:4-diene or a mono-olefin, may be employed with any other selected pair of reactants (remembering, of course, known limitations of certain catalyst systems, especially Ziegler-type catalysts which are not suitable for the polymerization of monomers containing oxygen, sulfur, etc. atoms).

EXAMPLE I

*Linear copolymer of divinyl ether and vinyl acetate*

Distilled water _____ 100 ml.
Aerosol OT _____ 0.5 g.
Potassium persulfate _____ 0.1 g.
Freshly distilled vinyl acetate _____ 17.2 g. (0.2 mole).
Freshly distilled divinyl ether _____ 7.0 g. (0.1 mole).

The components were charged to a pressure bottle and heated at 60–65° C. with constant agitation for two hours. The solution was cooled and the copolymer precipitated by the addition of a saturated solution of sodium chloride. After thorough washing, the product was dried, and was soluble in most common organic solvents. It was slightly soft at room temperature.

*Analysis.*—Calcd. for $C_{12}H_{18}O_5$: C, 59.5%; H, 7.44%. Found: C, 59.49%; H, 7.71%.

EXAMPLE II

*Linear copolymer of divinyldimethylsilane and acrylonitrile*

Benzene _____ 75 ml.
Freshly distilled acrylonitrile _____ 6.7 g. (0.125 mole).
Divinyldimethylsilane _____ 7.0 g. (0.0625 mole).
Benzoyl peroxide _____ 1.0 g.

The compounds were charged to a three-necked flask equipped with mechanical stirrer, and reflux condenser, and the solution refluxed for four hours. After an hour, the copolymer began to precipitate as a light brown powder. On cooling, the copolymer was removed by filtration, washed thoroughly with hot benzene and dried. It was found to be soluble in dimethylformamide, confirming its linear nature.

*Analysis.*—Calcd. for $C_{12}H_{18}N_2Si$: C, 66.0%; H, 8.25%. Found: C, 67.7%; H, 6.41%.

EXAMPLE III

*Linear copolymer of divinylcyclopentamethylenesilane and maleic anhydride*

Benzene _____ 75 ml.
Maleic anhydride _____ 12.25 mg. (0.125 mole).

Divinylcyclopentamethylene-
silane _____ 9.5 g. (0.0625 mole).
Benzoyl peroxide _____ 1.0 g.

The above components were charged to a suitable reaction vessel and refluxed for four hours. The copolymer began to precipitate after an hour as a white powder. After cooling, the product was isolated by filtration, washed thoroughly with hot benzene and dried. M.P. 350° C. It was soluble in dimethylformamide, dimethyl sulfoxide, and dilute aqueous sodium hydroxide.

*Analysis.*—Calcd. for $C_{17}H_{20}O_6Si$: C, 58.6%; H, 5.8%; Si, 8.1%. Found: C, 57.9%; H, 6.25%; Si, 7.65%. The product is a spirocopolymer.

EXAMPLE IV

*Linear copolymer of divinyl ether and acrylonitrile*

Distilled water _____ 100 ml.
Aerosol OT _____ 0.5 g.
Potassium persulfate _____ 0.1 g.
Freshly distilled acrylonitrile _____ 10.6 g. (0.2 mole).
Divinyl ether (freshly distilled) ____ 7.0 g. (0.1 mole).

The ingredients were charged to a pressure bottle and heated at 60–65° C. with constant shaking for two hours. After cooling, the emulsion was precipitated by the addition of a saturated sodium chloride solution. The white precipitated copolymer was separated by filtration, and dried. It was found to be soluble in dimethylformamide.

*Analysis.*—Calcd. for $C_{10}H_{12}ON_2$: C, 68.2%; H, 6.82%. Found: C, 65.1%; H, 6.23%. The copolymer possesses a high melting point which is characteristic of most polymers containing ring structures in the backbone of the polymer chain.

EXAMPLE V

*Linear copolymer of divinyl sulfone and maleic anhydride*

Benzene _____ 75 ml.
Maleic anhydride _____ 12.25 g. (0.125 mole).
Divinyl sulfone _____ 7.4 g. (0.0625 mole).
Benzoyl peroxide _____ 1.0 g.

The above compounds were charged to a three-necked flask equipped with a mechanical stirrer and reflux condenser, and refluxed for four hours. The solid copolymer began to precipitate after about an hour. After cooling, the product was separated by filtration, washed thoroughly with hot benzene and dried. It was found to be soluble in dimethylformamide, aqueous sodium hydroxide, and dimethyl sulfoxide, confirming its linear nature.

*Analysis.*—Calcd. for $C_{12}H_{10}O_8S$: S, 10.2%. Found: S, 7.55%. It melts above 250° C.

EXAMPLE VI

*Linear copolymer of divinyldimethylsilane and maleic anhydride*

Benzene _____ 75 ml.
Maleic anhydride _____ 12.25 g. (0.125 mole).
Divinyldimethylsilane _____ 7.0 g. (0.0625 mole).
Benzoyl peroxide _____ 1.0 g.

The solvent, monomers and catalyst were charged to a suitable reaction vessel and heated at reflux with stirring for four hours. The copolymer began to precipitate as a white powder after one hour. After cooling, the product was separated by filtration, washed thoroughly with hot benzene and dried. It was soluble in dimethylformamide, dimethylsulfoxide, and aqueous sodium hydroxide, confirming its linear nature. It melts above 250° C.

*Analysis.*—Calcd. for $C_{14}H_{16}O_6Si$: C, 54.6%; H, 5.2%; Si, 9.1%. Found: C, 54.6%; H, 5.7%; Si, 9.4%.

EXAMPLE VII

*Linear copolymer of divinyl ether and fumaronitrile*

Xylene _____ 75 ml.
Fumaronitrile _____ 9.75 g. (0.125 mole).
Divinyl ether (freshly distilled) __ 8.75 g. (0.0625 mole).
Benzoyl peroxide _____ 0.5 g.

The solvent, monomers, and catalyst were charged to a suitable pressure reaction vessel and heated at 60–65° C. for four hours, with agitation. After cooling, the benzene-insoluble copolymer which precipitated was removed by filtration, washed thoroughly with hot xylene, and dried. It was found to be soluble in dimethylformamide, confirming its linear nature.

*Analysis.*—Calcd. for $C_{12}H_{10}ON_4$: N, 24.8%. Found: N, 20.3%.

EXAMPLE VIII

*Linear copolymer of divinyl ether and maleic anhydride*

Xylene _____ 150 ml.
Maleic anhydride _____ 24.5 g. (0.25 mole).
Divinyl ether (freshly distilled) ___ 8.75 g. (0.125 mole).
Benzoyl peroxide _____ 0.5 g.

The above components were charged to a suitable reaction vessel and heated at 50–65° C. for four hours. The copolymerization is quite exothermic. After cooling, the insoluble, white powder was removed by filtration, washed thoroughly with hot xylene and dried at 80° C. The yield was 33 g. It was soluble in acetone and 10% NaOH solution. It was found to have an intrinsic viscosity of 0.175 in both dimethylformamide and two normal sodium hydroxide. It was analyzed for carbon and hydrogen and the following results obtained:

*Analysis.*—Calcd. for $C_{12}H_{10}O_7$: C, 54.13%; H, 3.76%. Found: C, 53.99%; H, 4.00%. Infrared analysis confirms the proposed structure for this copolymer.

EXAMPLE IX

*Linear copolymer of divinyl ether and fumaryl chloride*

Benzene _____ 75 ml.
Divinyl ether (freshly distilled) ____ 7.0 g. (0.1 mole).
Fumaryl chloride _____ 30.6 g. (0.2 mole).
Benzoyl peroxide _____ 1.0 g.

Above were charged to a pressure bottle and heated at 55–65° C. with shaking for two hours. The resulting product separated into two phases, a lower solid copolymer phase, and an upper benzene phase. The copolymer contained reactive acid chloride groups and can be reacted with other organic compounds, for example, alcohols, phenols, amines, etc. to produce novel and useful derivatives of this linear copolymer. It can be cross linked by reaction with a dihydric alcohol or a primary or secondary diamine.

EXAMPLE X

*Linear copolymer of divinyl sulfone and dimethyl fumarate*

Benzene _____ 100 ml.
Dimethyl fumarate _____ 28.8 g. (0.2 mole).
Divinyl sulfone _____ 11.8 g. (0.1 mole).
Benzoyl peroxide _____ 1.0 g.

The above components were charged to a pressure bottle and placed in a shaker, and heated at 60–65° C. for four hours with shaking. After cooling, the resulting solution was treated with an excess of heptane to precipitate the copolymer. The copolymer was insoluble in benzene, as would be expected from the presence of the polar sulfone group, but its solubility in dimethylformamide and dichlorobenzene confirms its linear nature.

EXAMPLE XI

*Linear copolymer of divinyl ether and diethyl maleate*

Distilled water _____ 100 ml.
Aerosol OT _____ 0.5 g.
Potassium persulfate _____ 0.1 g.
Divinyl ether _____ 7.0 g. (0.1 mole).
Diethyl maleate _____ 34.4 g. (0.1 mole).

The above compounds were charged to a pressure bottle, and heated at 65–70° C. for two hours; with shaking. The resulting emulsion was cooled and the copolymer precipitated with a saturated sodium chloride solution. The product was pure white, very viscous and tacky. It was washed thoroughly with distilled water and dried at 60–70° C. The copolymer was a white product which is readily deformed at room temperature. It is soluble in a number of solvents, confirming its linear nature. The yield, after a second reprecipitation, was 26 grams.

EXAMPLE XII

*Linear copolymer of divinyldimethylsilane and fumaryl chloride*

| | |
|---|---|
| Benzene | 75 ml. |
| Fumaryl chloride | 30.6 g. (0.2 mole). |
| Divinyldimethylsilane | 11.2 g. (0.1 mole). |
| Benzoyl peroxide | 1.0 g. |

The above components were charged to a suitable reaction vessel which was protected from moisture, and which had previously been flushed with dry nitrogen. The solution was refluxed for six hours. The resulting solution was evaporated to dryness to yield a dark brown copolymer. It was soluble in acetone, benzene, and dimethylsulfoxide.

EXAMPLE XIII

*Linear copolymer of divinylsulfone and dimethyl fumarate*

| | |
|---|---|
| Water (distilled) | 100 ml. |
| Aerosol OT | 0.5 g. |
| Potassium persulfate | 0.1 g. |
| Divinylsulfone | 11.8 g. (0.1 mole). |
| Dimethyl fumarate | 28.8 g. (0.2 mole). |

The above were charged to a pressure bottle and heated at 65–70° C. for three hours with constant agitation. The resulting solution was evaporated to yield the solid copolymer. It was insoluble in most common organic solvents, but was soluble in dichlorobenzene. It had a melting point of 290° C., confirming its linear nature.

EXAMPLE XIV

*Linear copolymer of divinyldimethylsilane and vinyl acetate*

| | |
|---|---|
| Benzene | 75 ml. |
| Vinyl acetate (freshly distilled) | 17.2 g. (0.2 mole). |
| Divinyldimethylsilane | 11.6 g. (0.1 mole). |
| Benzoyl peroxide | 1.0 g. |

The above compounds were charged to a suitable reaction vessel and refluxed for 6½ hours. The resulting solution was evaporated under vacuum. After purification, the polymer was a low melting yellow solid, soluble in most common organic solvents, confirming its linear nature.

EXAMPLE XV

*Linear copolymer of divinyldimethylsilane and acrylonitrile*

| | |
|---|---|
| Distilled water | 100 ml. |
| Aerosol OT | 0.5 g. |
| Potassium persulfate | 0.1 g. |
| Acrylonitrile | 10.6 g. (0.2 mole). |
| Divinyldimethylsilane | 11.2 g. (0.1 mole). |

The components were charged to a pressure bottle and heated for two hours at 65–70° C. with constant agitation. The emulsion was diluted at 300 ml. and then saturated sodium chloride solution was added until the polymer settled out. The white, solid product was filtered, washed with warm water and dried overnight at 65° C. It was found to be soluble in o-dichlorobenzene.

EXAMPLE XVI

| | |
|---|---|
| Isooctane | 150 ml. |
| Aluminum triethyl | 0.52 g. |
| Titanium tetrachloride | 0.29 g. |
| 1,4-pentadiene | 17 g. (0.25 mole). |
| Ethylene | 14 g. (0.5 mole). |

The isooctane was chromatographed through an activated alumina column to remove olefinic material and distilled from sodium. In a dry box under a dry nitrogen atmosphere, the aluminum triethyl-titanium tetrachloride catalyst (molar ratio 3:1) was prepared. This solution was charged to a suitable pressure reaction vessel and the 1,4-pentadiene added. All operations were performed under a dry nitrogen atmosphere. After sealing the vessel, anhydrous ethylene was admitted to the total pressure required for a total charge of 14 g. of ethylene; the reaction mixture was then heated to 50° C. with agitation for a total time of seventy-two hours. After cooling, the solution was removed and the copolymer was precipitated by pouring the hydrocarbon solution into methanol. The solubility of the copolymer in the hydrocarbon solvent confirms its linear non-cross-linked structure.

EXAMPLE XVII

*Hydrolysis of divinyl ether maleic anhydride copolymer*

A 5 g. sample of the copolymer of Example VIII, (divinyl ether and maleic anhydride) was added to 10 ml. of water and heated on a steam bath. After several minutes, the copolymer dissolved through hydrolysis of the anhydride rings to the polycarboxylic acid. The polycarboxylic acid was found to be soluble in water and to possess all of the expected properties of such a structure. Evaporation of the excess water under vacuum left the polycarboxylic acid as a clear, plastic, glass-like material which could be ground to a white powder. The hydrolysis was also accomplished by treating the copolymer with aqueous sodium hydroxide, and neutralizing the sodium salt of the polycarboxylic acid with mineral acid. The polycarboxylic acid was found to have a neutral equivalent of 75.5.

If the copolymer of Example IX is similarly hydrolyzed to convert the acid chloride groups to carboxylic acid groups, a different polycarboxylic acid is obtained.

EXAMPLE XVIII

*Linear copolymer of 1,4-pentadiene and maleic anhydride*

| | |
|---|---|
| Xylene | 150 ml. |
| 1,4-pentadiene | 8.5 g. (0.125 mole). |
| Maleic anhydride | 24.5 g. (0.25 mole). |
| Benzoyl peroxide | 0.5 g. |

The solvent, monomers, and catalyst were charged to a suitable pressure reaction vessel and heated to 70° C. for fifteen hours with agitation. During the first hour of heating at the above temperature, the white, insoluble copolymer began to precipitate. After cooling, the xylene-insoluble copolymer was removed by filtration, washed thoroughly with hot xylene, and dried. It was found to be soluble in acetone, confirming its linear nature. The yield was quantitative.

EXAMPLE XIX

| | |
|---|---|
| Xylene | 150 ml. |
| Perfluoro-1,4-pentadiene | 26.5 g. (0.125 mole). |
| Trifluorochloroethylene | 29.2 g. (0.25 mole). |
| Trichloroacetyl peroxide | 0.5 g. |

The above components were charged to a suitable pressure reaction vessel and heated to 70° C. for 48 hours, with agitaion. During this time, the cyclic copolymer formed. After isolation, it was found to be fusible, and soluble in a number of solvents, confirming its linear non-cross-linked structure. Trifluorobromoethylene, and tetrafluoroethylene can be substituted for trifluorochloroethylene in the above example, the latter comonomer producing a completely fluorinated linear copolymer, having the repeating cyclic units according to the general formula previously indicated.

EXAMPLE XX

| | |
|---|---|
| Xylene | 150 ml. |
| Perfluoro-1,4-pentadiene | 26.5 g. (0.125 mole). |
| Maleic anhydride | 24.5 g. (0.25 mole). |
| Benzoyl peroxide | 0.5 g. |

The solvent monomers and catalyst were charged to a suitable reaction vessel and heated to 70° C. for 24 hours, with agitation. After cooling, the xylene-insoluble copolymer which formed was removed by filtration, washed with hot xylene, and dried. The yield was quantitative. The product was soluble in a number of solvents, confirming its linear nature. The copolymer was found to be soluble in aqueous sodium hydroxide, producing sodium salt of the copolymer by hydrolysis of the anhydride linkages.

In the process of this example or in that of Example XIX, the perfluoro-1,4-pentadiene may be replaced by 2,4-dichloro-1,4-pentadiene or 1,1-dichloro-1,4-pentadiene to yield other halogenated copolymers according to the general formula previously indicated.

EXAMPLE XXI

*Linear copolymer of 3,3-dimethyl-1,4-pentadiene and maleic anhydride*

| | |
|---|---|
| Xylene | 150 ml. |
| 3,3-dimethyl-1,4-pentadiene | 12.0 g. (0.125 mole). |
| Maleic anhydride | 24.5 g. (0.25 mole). |
| Benzoyl peroxide | 0.5 g. |

The 3,3-dimethyl-1,4-pentadiene was prepared by the Method of Cialo and Burwell (J. Org. Chem. 23, 1063 (1958)). The solvent monomers and catalyst were charged to a suitable pressure reaction vessel and heated to 70° C. for fifteen hours with agitation. During the first hour of heating, a white insoluble copolymer began to precipitate. After cooling the xylene-insoluble copolymer was removed by filtration, washed thoroughly with hot xylene, and dried. It was found to be soluble in acetone, confirming its linear nature.

It will be appreciated that, while my invention has been particularly described with reference to certain specific embodiments thereof equivalent procedures and materials may be used, and the principle and scope thereof is limited only by the following claims.

I claim:
1. Novel linear high molecular weight copolymers useful in forming molded or fiber or film articles consisting essentially of the repeating unit of the structure:

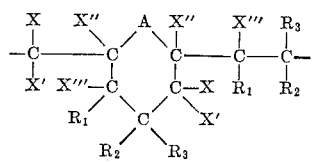

wherein A is an element selected from the group consisting of Groups IVa, Va, and VIa of the Periodic Table, said groups including elements 6, 7, and 8, respectively, the free valencies of which are satisfied by bonding to a radical selected from the group consisting of oxygen, hydrogen, lower alkyl, lower alkylene, cyano-lower alkyl, monocyclic aryl, carboxy-lower alkyl and halogen; wherein $R_1$ and $R_2$ are selected from the group consisting of hydrogen, lower alkyloxy, carboxy lower alkyl, nitrile and carboxyhalide, and together $R_1$ and $R_2$ represent when A stands for an element other than oxygen, the anhydride radical

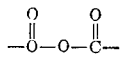

wherein $R_3$ stands for a member selected from the group consisting of hydrogen and lower alkyl; and wherein X, X', X'', and X''' are selected from the group consisting of hydrogen, lower alkyl, monocyclic aryl, nitrile, halogen, and carboxy-lower alkyl.

2. A linear copolymer according to claim 1 and having the repeating unit of the structure:

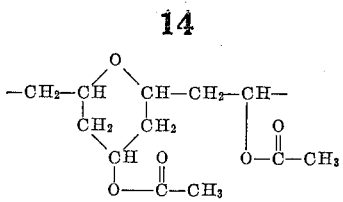

3. A linear copolymer according to claim 1 and having the repeating unit of the structure:

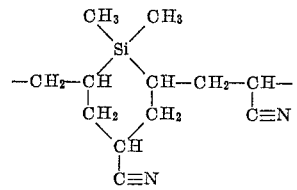

4. A linear copolymer according to claim 1 and having the repeating unit of the structure:

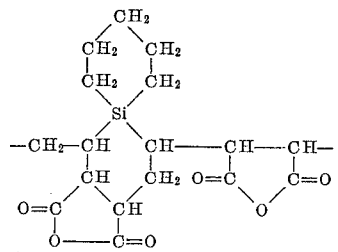

5. A linear copolymer according to claim 1 and having the repeating unit of the structure:

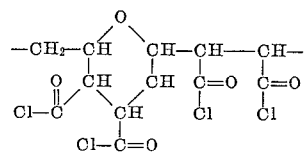

6. A linear copolymer according to claim 1 and having the repeating unit of the structure:

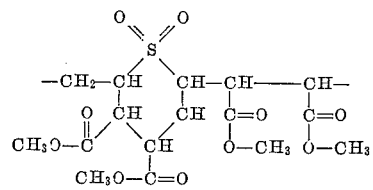

7. A process for the preparation of linear copolymers consisting essentially of the repeating unit of the structure:

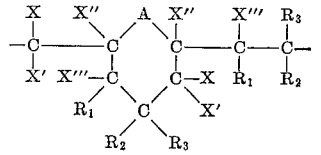

wherein A is an element selected from the group consisting of Groups IVa, Va, and VIa of the Periodic Table, the free valencies of which are attached to a radical selected from the group consisting of oxygen, hydrogen, lower alkyl, lower alkylene, cyano-lower alkyl, monocyclic aryl, carboxy-lower alkyl and halogen; wherein $R_1$ and $R_2$ are selected from the group consisting of hydrogen, lower alkyloxy, carboxy lower alkyl, nitrile and carboxyhalide, and together $R_1$ and $R_2$ represent, when A stands for an element other than oxygen, the anhydride radical

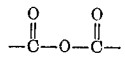

wherein $R_3$ stands for a member selected from the group consisting of hydrogen and lower alkyl; and wherein X, X', X'', and X''' are selected from tthe group consisting of hydrogen, lower alkyl, monocyclic aryl, nitrile, halogen, and carboxy-lower alkyl, which comprises copolymerizing approximately 1 molar part of a 1:4-diene monomer of the formula

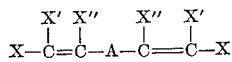

with approximately 2 molar parts of a monoolefin monomer having the formula

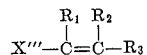

where X, X', X", X''', $R_1$, $R_2$, and $R_3$ have the definitions stated above in the presence of a catalytic amount of a free radical catalyst in a reaction medium, at a total monomer concentration of at least about 15%, by weight, of the total ingredients, and at a temperature above 0° C. and below the decomposition of said monomers for a necessary period of time of at least one hour.

8. The process of claim 7, wherein said temperature is from about 40° C. to about 75° C.

9. The process of claim 7 further defined as conducted in an inert solvent for said monomers.

10. The process of claim 7, wherein said copolymerization is carried out with said monomers dispersed in aqueous emulsion.

11. The process of claim 7, wherein said catalyst is selected from the group consisting of benzoyl peroxide and a mixture of aluminum triethyl titanium tetrachloride.

12. The process of claim 7 wherein said catalyst is composed of a mixture of aluminum triethyl titanium tetrachloride.

References Cited by the Examiner
UNITED STATES PATENTS

| | | | |
|---|---|---|---|
| 2,532,583 | 12/1950 | Tyran | 260—86.1 |
| 2,619,491 | 11/1952 | Smith | 260—86.1 |
| 2,798,053 | 7/1957 | Brown | 260—80.3 |

JOSEPH L. SCHOFER, *Primary Examiner.*

J. KIGHT, L. G. CHILDERS, *Assistant Examiner.*